Dec. 27, 1955     J. ADAMS, JR     2,728,239
POWER TRANSMISSION DRIVE AND BELT THEREFOR
Filed Aug. 12, 1953     2 Sheets-Sheet 1
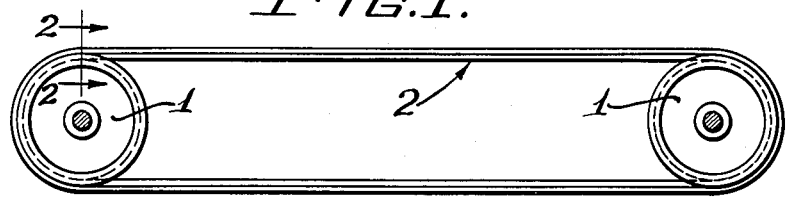
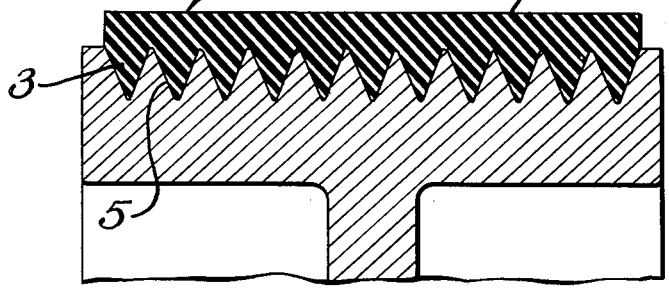
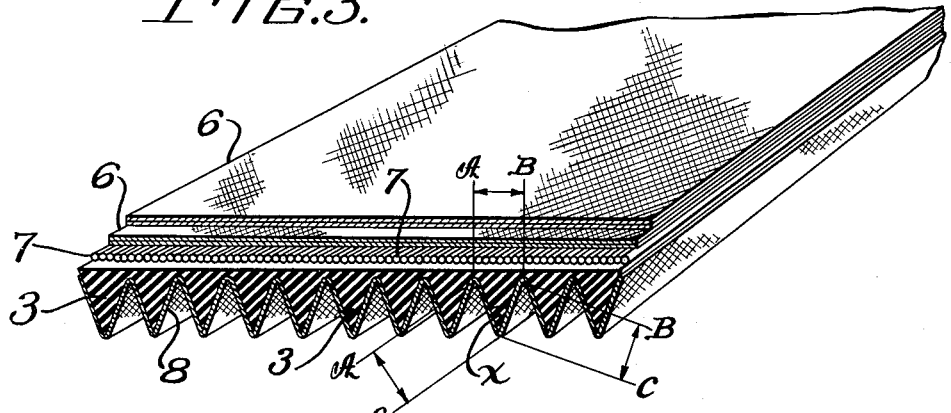
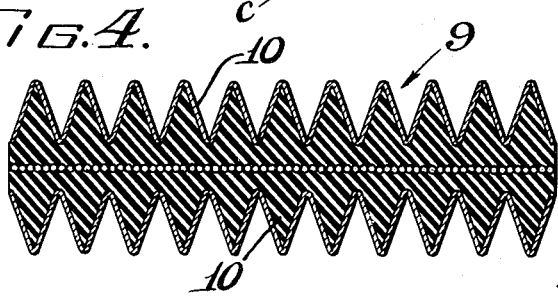
Inventor:
James Adams Jr.
By Gary, Desmond & Parker
Attys.

Dec. 27, 1955   J. ADAMS, JR   2,728,239
POWER TRANSMISSION DRIVE AND BELT THEREFOR
Filed Aug. 12, 1953   2 Sheets-Sheet 2

Inventor:
James Adams, Jr.
By Gary, Desmond & Parker
Attys.

United States Patent Office 2,728,239
Patented Dec. 27, 1955

2,728,239

POWER TRANSMISSION DRIVE AND BELT THEREFOR

James Adams, Jr., Passaic, N. J., assignor to Raybestos-Manhattan, Inc., Passaic, N. J., a corporation of New Jersey Application August 12, 1953, Serial No. 373,766

5 Claims. (Cl. 74—229)

This invention relates to improvements in a belt drive and a belt therefor and is a continuation-in-part of my copending patent application Serial No. 266,194, filed January 12, 1952, which, in turn, was a continuation-in-part of my patent application Serial No. 245,705, filed September 8, 1951, both now abandoned and refers particularly to a belt drive employing a multiple groove belt wherein the tractive face of the belt carries a plurality of serrations or longitudinal ribs, preferably of V cross-sectional contour, said ribs being adapted to engage in a plurality of grooves of substantially similar section as the ribs, provided in the face of a pulley.

So called V-belts and multiple groove belts have heretofore been employed for power transmission purposes. In most instances the belts are not of V-section but are of trapezoidal section, but in some instances true V-sectioned belts have been proposed. However, in all instances, to my knowledge, the belts, which engage in grooved pulleys, do not completely register with or fill the grooves in the pulleys. This relationship of belt section to groove section has been contrived purposely since the art has heretofore been desirous of avoiding "bottoming" of the belt in the pulley groove, that is, the condition which would exist where the apex or inner extremity of the V of the belt or minor base of the trapezoid would rest upon the bottom of the groove of the pulley.

In the prior art the efficacy of a V-sectioned transmission belt depended substantially entirely upon the wedging which occurs between the lateral sides of the V or trapezoid belt section and the lateral side walls of the V or trapezoidal groove. Consequently, the load, or tension of the belt which results in a radial thrust of the belt when the belt passes around a pulley was intended to augment the wedging action and to do this a degree of freedom or radial movement of the belt in the groove was deemed necessary. That is, clearance space was always provided in the pulley groove, even at full load, so that the wedging action could be effective. If the belt "bottomed," that is, if no clearance space were provided between the bottom of the groove and the apex of the V-belt or the minor base of a trapezoidal belt and the base of the groove, the wedging action would be detrimentally affected.

In addition, in prior art belts of the multiple groove type clearance space was always provided at the base of the V-grooves in the belt, so that the apex of the ribs in the pulley face would not contact the base of the V-grooves in the belt. This provision was in addition to the clearance space between the apex of the belt ribs and the base of the pulley grooves.

In my invention, I rely upon that property of rubber, rubber compounds or other elastomeric material as viscous fluids which in so far as compression is concerned, behave similar to a liquid, that is, they are substantially incompressible in the sense that pressure exerted upon one portion thereof is transmitted equally in all directions where deformation is relatively small.

Accordingly, employing soft rubber or other soft elastomeric material, I so dimension the ribs of the working face of a multiple groove belt relative to the grooves of a pulley with which the belt operates, that there is no clearance space during operation of the belt between the inner ends of the belt ribs and the bases of the pulley grooves, and the outer ends of the pulley ribs and the bases of the belt grooves, or stated otherwise, there is no clearance space during operation of the belt both at the apexes and the bases of the belt ribs (or the apexes and bases of the ribs that define the pulley grooves). Hence, tension or load upon the belt which results in a radial thrust of the belt upon the pulley exerts a compressional force upon the belt sections confined in the grooves which is transmitted throughout the contact area of the belt and the pulley. In this fashion the entire contact area of the serrated working face of the belt and the entire contact area of the grooved working face of a pulley is utilized in the transmission of power. This results in a belt of smaller overall dimensions for a predetermined power capacity than has heretofore been obtainable, or stated conversely, for a predetermined overall belt size the load per unit of contact area is less than has heretofore been the case.

A further important feature of my invention resides in the position of the tension or strength members relative to the ribs in a multiple groove belt. In multiple groove belts heretofore proposed, the tension or strength members were positioned in the ribs themselves whereas in my construction the tension or strength members are positioned outwardly from the belt ribs, that is, they are positioned in the planar portion of the belt radially outwardly from the ribs and from the pulley grooves considered as the belt passes around a pulley. This permits the use of a greater number of strength members for a belt of predetermined width, and constitutes an advantageous positioning of the strength members in exerting a radial thrust in passage over a pulley to secure the hydrostatic force transmission in the belt ribs as contemplated in the present invention.

Other objects and advantages of my invention will be apparent from the accompanying drawing and following detailed description.

In the drawing,

Fig. 1 is a side elevational view of my multiple groove belt trained around a pair of pulleys.

Fig. 2 is an enlarged transverse detailed section taken on line 2—2 of Fig. 1.

Fig. 3 is a fragmentary enlarged sectional view of my improved belt.

Fig. 4 is a transverse sectional view, portions of which are diagrammatically shown, of a modification of my invention.

Figure 5:
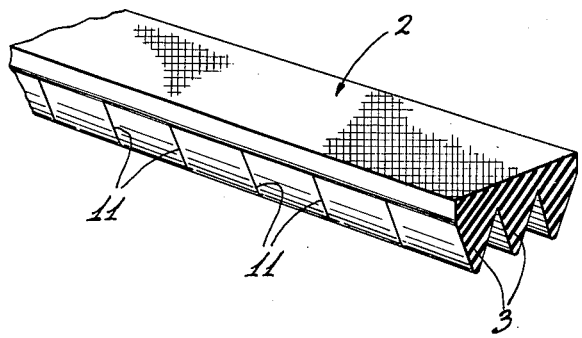
Fig. 5 is a perspective view of another modification of the belt.

Referring in detail to the drawing, 1, 1 indicate a pair of spaced pulley wheels over which an endless, flexible belt 2 is trained. The belt 2 is of multiple groove type, that is, its working face carries a plurality of adjacent V-sectioned ribs 3 and the top portion 4 is flat. The pulleys 1 have a plurality of annular grooves 5 provided in their faces, the grooves being so shaped and so dimensioned as to receive the belt ribs 3 with no intended clearance space. This latter constitutes a basic concept of my invention, that is, that the belt ribs and grooves interfit as closely as possible, within reasonable limits of machining and molding, with the pulley ribs and grooves so that during operation of the belt no intended clearance space exists therebetween.

Although the expression "V-shaped cross-sectional contours" is employed in the claims, it is not intended that the respective ribs and grooves be only of true triangular or V-section, since a trapezoidal section or similar section for ribs and grooves may be employed, if desired, provided that the absence of clearance space between the interfitting sections obtains. Preferably, an approximate V-section is preferred, that is, a section for both ribs and grooves which may have a relatively small radius of curvature or fillet at the crest of the ribs and base of the grooves. Preferably, the radius of curvature is in the order of magnitude of about 6 per cent of the projected height of the ribs or projected depth of the grooves. Of course, if fillets are employed, they will be employed both upon the belt and the pulleys so that as near complete interfitting as possible be obtained between the belt ribs and grooves and the pulley ribs and grooves.

For purposes of explanation a relatively wide belt having a relatively large number of ribs and grooves will be described, but it is to be understood that belts of any desired width with at least two or more ribs forming a continuous tractive face is broadly contemplated by the invention.

In construction the belt 2, one or more sheets of rubberized fabric 6, 6 are laid over a plurality of tension or strength members 7. The strength members 7 preferably comprise a plurality of cords laid parallel to each other and parallel to the length of the belt, the parallel strength members being disposed in one or more layers which are substantially parallel to the plane of the sheet or sheets 6, 6. The strength members 7 are, as their name implies, the members which are adapted to sustain the tension load during the operation of the belt and said members are disposed adjacent the neutral axis or neutral plane of the belt, that is, that portion of the belt above which tension occurs and below which compression occurs when the belt is trained around a pulley. In order to provide transverse and longitudinal extensibility of the cover fabrics 6, 6, the weave of said fabric is preferably on the bias, that is, the weave is diagonal with respect to the length and width of the belt.

Adjacent the layer of strength members 7 on the opposite side thereof from the cover fabric 6, a relatively thick layer of rubber or other suitable elastomeric material is disposed which, after the entire carcass is molded in a suitable mold (not shown) of the conventional type, forms the ribs 3. The cover fabrics 6, 6 and the strength members are rubberized or otherwise saturated or impregnated with elastomeric material and consequently when the carcass is molded and cured, a substantially integral is formed, bound together by the rubber or elastomeric material employed.

Since the effectiveness of my invention is dependent upon the relative incompressibility of the ribs 3 and that the radial thrust exerted upon said ribs is to be transmitted substantially undiminished to all parts of the contact surfaces of the ribs 3 and grooves 5, the material comprising the ribs 3 must be sufficiently soft and incompressible to meet these requirements. I have found that substantially all rubber or rubber compound material heretofore used for V-belts, wedge belts or multiple groove belts is satisfactorily soft and uncompressible for purposes of my invention. In addition, other materials have also been found to be satisfactory, which I have herein designated generally as "elastomeric" materials, including synthetic rubbers vinylidene chloride, poly-vinyl chloride, poly-vinyl alcohol, polysulfide rubbers, butyl rubber, compounds of poly esters, chlorosulfonated polythene or suitable compounds thereof. By appropriate compounding, the hereinbefore mentioned polymers and resins or mixtures thereof may be employed to produce the substantially incompressible viscous rubber-like fluid material necessary to achieve the hydrostatic pressure required in the present invention.

If desired, the ribbed portion of the belt may comprise "processed" leather, that is, a leather made soft, durable, dense and flexible such as by oak or chrome tanning commonly employed in the manufacture of leather belts, and also leathers impregnated with phenol-formaldehyde or alkyd resins. These leather materials have been found to possess the necessary qualities of softness and relative incompressibility for use in the present invention and will also be embraced by the designation "elastomeric" material.

A fabric layer 8 may cover the ribs 3, said fabric layer being disposed over the elastomeric portion of the carcass prior to the molding operation and being molded in conformation with the ribs 3. The layer 8 may comprise one or more fabric sheets or, as described in my copending patent application Serial No. 245,706, filed September 8, 1951, now Patent No. 2,620,016, granted December 2, 1952, the cover for the ribs may comprise a plurality of offset fabric strips. Of course, if desired the ribs 3 may be left uncovered by any fabric.

It will be noted that the strength members 7 are disposed outwardly from the bases of the grooves and ribs 3, that is, the layer of strength members will be disposed radially outwardly from the pulley grooves, when the belt passes around the pulley. The layer of strength members thus form radial thrust-producing agents for the entire volume of elastomeric material in contact with the pulley ribs and grooves. Hence, when the belt passes around a pulley the layer of strength members tends to compress the soft elastomeric material comprising the ribs 3 in the confining grooves of the pulley. In view of the fact that the belt ribs 3 and the pulley grooves 5 are by virtue of their original construction, substantially completely registrable with each other, a substantially complete confinement of the belt ribs occurs and the inward radial thrust of the strength members sets up the hydrostatic pressure between said registering surfaces which gives effectiveness to my invention.

I have found that the effectiveness of my belt is a function of the ratio of the zig-zag transverse length to the width of the belt. Referring particularly to Fig. 3, the ratio referred to comprises the ratio of the length BC plus CA to the length AB. It can be seen that the summation of all of the lengths AB across the width of the belt times the wrapped around length of the belt with respect to a pulley comprises an area over which the radial thrust of the layer of strength members 7 act. The effective pressure of the belt against the pulley, since the force is transmitted substantially undiminished to all portions of the material comprising the ribs 3, is proportional to the length of BC plus CA times said wrapped around length. Accordingly, the pressured area of the belt against the pulley increases with a decrease of the angle X and decreases as said angle increases. However, to facilitate the ingress and egress of the belt ribs 3 into and out of grooves 5 the ratio, hereinbefore described, has an upper practical limit. I have found that the groove angle X may be between about 26° and 45°, and is preferably in the neighborhood of 40°.

As an example of my invention, I have found that with a groove angle X of 40° and fillets and radii of about 6 per cent of the projected depth of the rib, the ratio, hereinbefore described is about 2.44, that is, the hydrostatic surface pressure of the belt upon the pulley is about 2.44 times the radial thrust pressure.

It can readily be seen, as indicated by the ratio hereinbefore described, that my invention is not dependent upon the specific cross-sectional shape of the rib 3. However, I have found that the V-shaped section or a section approximating a V shape produces the greatest ratio with the easiest ingress and egress of the belt to and from the pulley which is of especial importance in cases of angular and misaligned drives. It is essential, however, that whatever the belt rib section, it be so correlated to the pulley grooves that there be substantially conformation and substantially total confinement of the rib section.

Referring particularly to Fig. 4 a modification of my invention is shown wherein belt 9 has two working faces each of which carries longitudinal ribs 10. The structural features of belt 9 are similar to belt 2 except layers of fabric are absent, the belt being substantially symmetrical about the strength member 11. The belt 9 is particularly adaptable for serpentine drives where opposite faces of the belt engage pulleys. The advantages of belt 9 are similar to those hereinbefore described in conjunction with belt 2.

If desired, the ribs 3 and 10 may be provided with a plurality of transverse slits or cuts 11, 11 shown in Fig. 5 of the drawings which when the working face of the belt is subjected to tension, as when making a reverse turn around idler or guide pulleys, facilitates the flexing of the belt. The slits or cuts normally contemplate no actual spacing of the surfaces defining the slits or cuts when the belt is in its normal straight condition and only contemplates that said surfaces separate when the belt is reversely flexed. Of course, slits or cuts of the dimensions contemplated will have no effect upon the operation of the belt as hereinbefore described as to the hydrostatic pressure exerted by the ribs in the pulley grooves.

Figure 6:
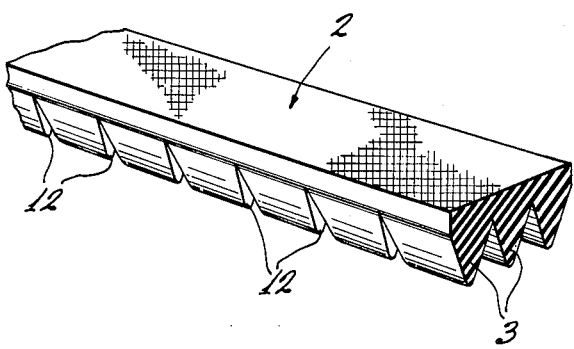
Figs. 6 and 7 are perspective views showing a still further modification of the belt and its functioning in use.
Figure 7:
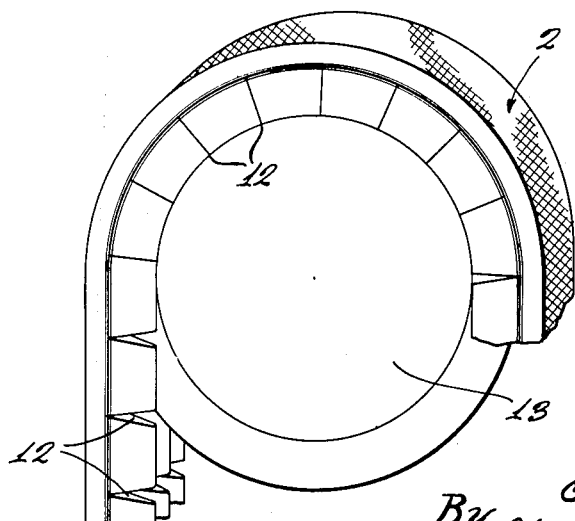

When belts of the character described are passed around pulleys or sheaves of relatively small diameter, there is a tendency for the ribs of the belt to distort laterally. Such distortion is undesirable because of the excessive heat generated by the excessive flexing and kneading of the material comprising the ribs. I have found that where this condition of use occurs, the ribs may be provided with a plurality of spaced transverse triangular slots such as 12, 12 shown in Figs. 6 and 7 of the drawings. Only enough material is removed in providing the slots to eliminate the lateral distortion, but not sufficient to destroy the uniform distribution of the hydrostatic pressure upon the sheave walls. That is, when the belt passes around the small diameter pulley or sheave 13 the slots just completely close, as is indicated in Fig. 7 of the drawings.

This lateral distortion or piping of the belt ribs begins to be noticeable when the distance from the neutral axis of the belt to the apexes of the belt ribs is about 8 per cent or more of the bending (sheave) diameter. For example, a belt with 3/16 inch wide ribs has a 1/4 inch distance from its neutral axis to the crests or apexes of the ribs will commence to exhibit lateral distortion of the ribs if flexed in a diameter below about 3 inches. For diameters below 3 inches, in this case, slotting of the ribs will eliminate the undue lateral distortion. In the above example, transverse triangular slots 1/16 inch at their widest dimension at the ribbed crest, 3/16 inch deep and spaced 5/16 inch apart were provided in the ribs. The above is merely set forth for purposes of illustration and is not intended as a limitation of the invention since, the dimensions of the slots will depend, as hereinbefore described, upon the diameter of the pulley or sheave around which the belt is wrapped and upon the distance of the apices or crests of the ribs from the neutral axis of the belt.

Although the present invention is particularly adaptable and of advantage in power transmission belts, it may also be employed to similar advantage with conveyor belts. When the load upon the belt is relatively light and bulky, it may be found that it is sufficient that only a portion of the full width of the traction surface of the belt need be ribbed. The maximum tractive grip will, of course, be obtained by making the entire width of the traction surface ribbed. The pulleys in either case are grooved correspondingly to receive the ribbed surface where it occurs on the belt. Where the entire tractive surface of the belt is not ribbed it may be found desirable to symmetrically distribute the gripping effect of the ribbed surface by making two or more ribbed bands or zones spaced across the width of the belt.

It is apparent that herein is provided a drive employing a multiple groove belt and a conforming pulley characterized in that less and more even wear occurs upon both belt and pulley than with drives heretofore proposed; a drive wherein the driving surface is increased for belts of equal width or wherein the unit pressure of belt and pulley is decreased, resulting in less mutual wear for belts of equal widths.

I am aware that many modifications of my invention may be made without departing from the fundamental concept thereof and, hence, I do not wish to be limited except as contemplated by the appended claims.

I claim as my invention:

1. In the combination of a rib-and-groove tractive face belt for service as a transmission belt, conveyor belt or the like and a groove-and-rib pulley over which the belt is trained, the pulley having grooves and ribs to correspond and to mate with the rib-and-groove tractive face of the belt, the belt comprising a flexible belt having a transversely and longitudinally strengthened outer body section and an inner tractive section, said tractive section comprising alternating ribs and grooves V-shaped in profile defining a continuous tractive face of the belt, said ribs and grooves being disposed parallel to each other and arranged parallel to the length of the belt, said belt ribs and grooves having V-shaped cross-sectional contours the same respectively as V-shaped cross-sectional contours of the mating pulley grooves and ribs and registering completely therewith upon ribs-and-grooves engagement, whereby the belt ribs and grooves interfit with the pulley grooves and ribs respectively with total confinement and with no clearance space therebetween during operation of the belt over the pulley, the material of said belt between the said outer body section and the tractive face thereof comprising an incompressible and elastomeric substance, whereby the radial thrust produced in operation by the said outer body section of the belt upon the completely registered belt ribs and pulley grooves exerts a compressional force which is transmitted with an hydrostatic pressure at all the contact areas between the belt ribs and grooves and the pulley grooves and ribs.

2. The combination of claim 1 in which the V-shaped profile of the ribs and grooves is between 26° and 45°.

3. The combination of claim 1 in which the V-angles of the V-shaped profile of the ribs and grooves is 40°.

4. In the combination of claim 1, a strength member embedded in the outer body section of the belt to provide the transverse and longitudinal strengthening thereof, said strength member being arranged to overlie said belt ribs and grooves, and the elastomeric substance of the belt material lying between said strength member and the tractive face of the belt.

5. In the combination of a rib-and-groove tractive face belt for service as a transmission belt, conveyor belt or the like and a groove-and-rib pulley over which the belt is trained, the pulley having grooves and ribs to correspond and to mate with the rib-and-groove tractive face of the belt, the belt comprising a flexible belt having an outer body section and an inner tractive section, said tractive section comprising alternating ribs and grooves V-shaped in profile defining a continuous tractive face of the belt, said ribs and grooves being disposed parallel to each other and arranged parallel to the length of the belt, said belt ribs and grooves having V-shaped cross-sectional contours the same respectively as V-shaped cross-sectional contours of the mating pulley grooves and ribs and registering completely therewith upon ribs-and-grooves engagement, whereby the belt ribs and grooves interfit with the pulley grooves and ribs respectively with total confinement and with no clearance space therebetween during operation of the belt over the pulley, the material of said belt between the said outer body section and the tractive face thereof comprising an incompressible and elastomeric substance, whereby the radial thrust produced in operation by the said outer body section of the belt upon the completely registered belt ribs and pulley grooves exerts a compressional force which is transmitted with an hydrostatic pressure at all the contact areas between the belt ribs and grooves and the pulley grooves and ribs.

References Cited in the file of this patent

UNITED STATES PATENTS

| | | |
|---|---|---|
| 235,018 | Poullain | Nov. 30, 1880 |
| 1,656,628 | Gits | Jan. 17, 1928 |
| 1,777,864 | Short | Oct. 7, 1930 |
| 2,060,322 | Johnson | Nov. 10, 1936 |
| 2,067,400 | Koplin et al. | Jan. 12, 1937 |
| 2,182,461 | Yeakel | Dec. 5, 1939 |
| 2,442,037 | Carter et al. | May 25, 1948 |
| 2,471,969 | Meyer | May 31, 1949 |
| 2,472,513 | Bergquist | June 7, 1949 |

FOREIGN PATENTS

| | | |
|---|---|---|
| 202,110 | Canada | July 20, 1920 |